Feb. 28, 1933.     O. U. ZERK     1,899,251
RESISTANCE UNIT
Filed Jan. 24, 1929
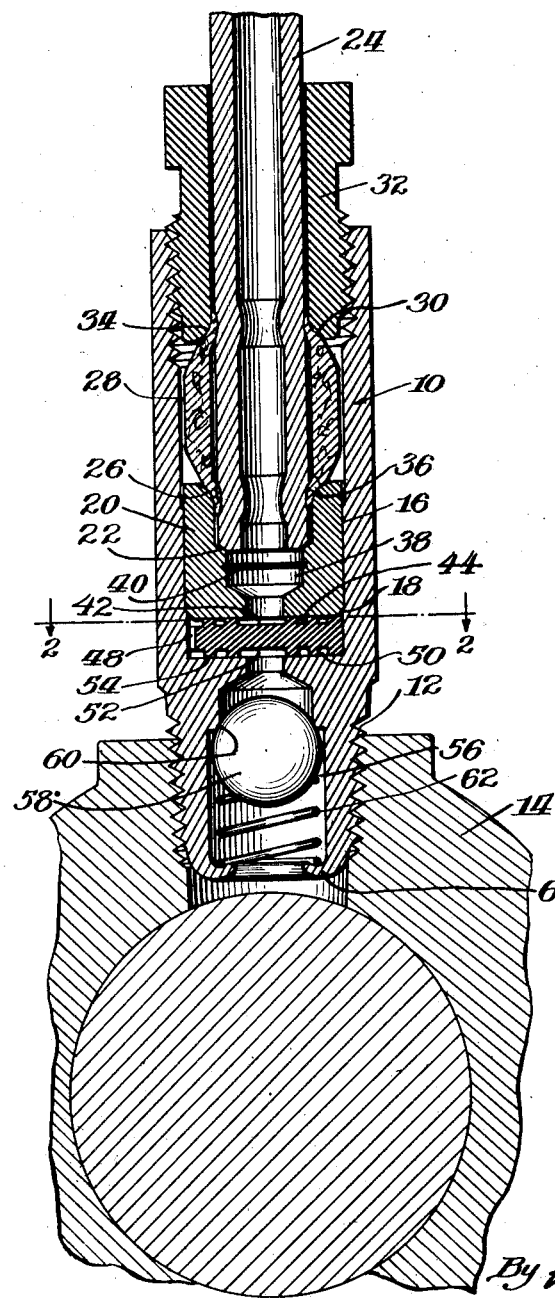
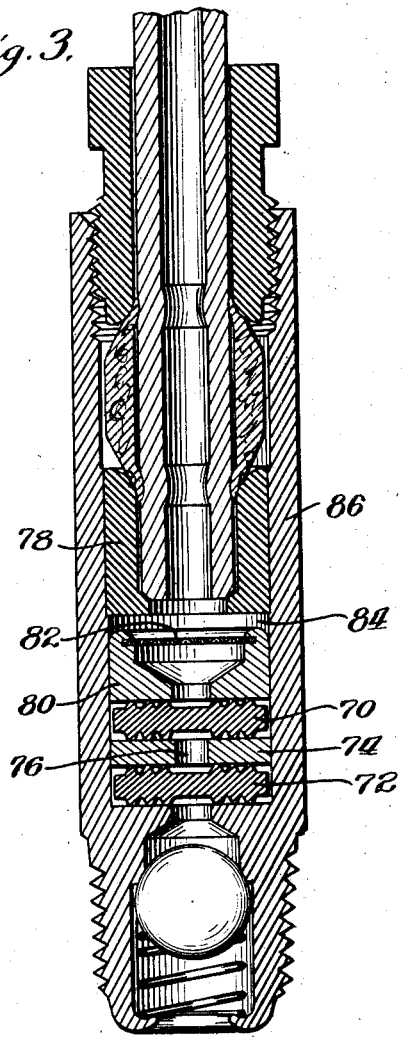
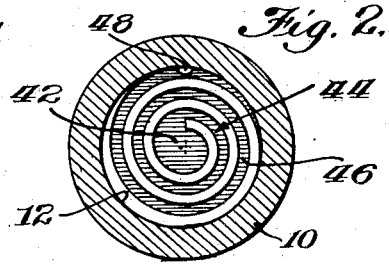
Inventor
Oscar U. Zerk.
By Williams Bradbury
McCaleb + Hirtzel
Attys.

Patented Feb. 28, 1933

1,899,251

UNITED STATES PATENT OFFICE

OSCAR U. ZERK, OF CHICAGO, ILLINOIS, ASSIGNOR TO ALEMITE CORPORATION, OF CHICAGO, ILLINOIS, A CORPORATION OF DELAWARE

RESISTANCE UNIT

Application filed January 24, 1929. Serial No. 334,683.

My invention relates to resistance units and more particularly to resistance units adapted for use in lubricating systems of the centralized type. Lubricating systems of the so-called centralized type comprise in general a supply installation usually consisting of a reservoir and lubricant pump, a system of piping connecting the supply installation with the various bearings to be lubricated, and resistance units or other metering means adjacent the bearings to be lubricated and serving to apportion the lubricant among the various bearings in accordance with their needs. It is to such resistance units that this invention pertains.

An object of my invention is to provide a new and improved resistance unit.

Another object is to provide a resistance unit which is simple and economical to manufacture and which is durable and reliable in use.

Another object is to provide a resistance unit of minimum length.

Another object is to provide a resistance unit which can be directly attached to a bearing part and will not project therefrom sufficiently to interfere with other parts adjacent the bearing.

Another object is to provide a new and improved resistance element per se.

Another object is to provide a resistance unit which can be economically manufactured in various ratings for use with bearings requiring different quantities of lubricant.

Other objects and advantages will be apparent as the description proceeds.

In the drawing,

Fig. 1 is a section of one embodiment of my new and improved resistance unit showing it applied to a bearing;

Fig. 2 is a section on the line 2—2 of Fig. 1; and

Fig. 3 is a section of a modification of the unit shown in Fig. 1, and providing a greater resistance than the latter unit.

Referring to the drawing, my new and improved resistance unit has a body 10 threaded at its lower end as indicated at 12 for attachment to a bearing 14 or similar part. The body 10 is provided with a bore 16 terminating at a shoulder 18 upon which rests a socket member 20 provided with an internal shoulder 22 against which rests the end of a pipe 24 which serves to connect the resistance unit with a source of lubricant supply. The upper edge 26 of the socket member 20 is rounded to receive the tapered lower edge of a compression sleeve or resistance coupler ring 28. The upper edge of the compression sleeve 28 is also tapered and received in the rounded lower end 30 of a tubular nut 32. The nut 32 is threadedly engaged in the body 10 and when the nut 32 is firmly screwed into the body 10 the compression sleeve and pipe 24 are deformed as indicated at 34 and 36, to firmly interlock the pipe 24 and socket member 20 and effect a lubricant-tight seal therebetween.

The socket member 20 has a passageway 38 of varying diameter and in the larger part of this passageway is located a screen 40 which removes the dirt and other impurities from the lubricant before it passes to the extremely small passageway which resists the flow of lubricant. The passageway 38 serves to establish communication between the pipe 24 and a circular depression 42 in the upper face of a resistance element 44. The circular depression 42 communicates with a spiral groove 46 of small cross section cut in the upper face of the resistance element 44 and leading to a vertical passageway 48 formed between the peripheral edge of the element 44 and the wall of a bore in the body 10. The lower end of the passageway 48 communicates with a similar groove 50 cut in the lower face of the resistance element 44 and connecting the passageway 48 with a circular recess 52 centrally located in the lower face of the element 44. The resistance element 44 is firmly clamped between the socket member 20 and a shoulder 54 in the body 10 so that the spiral grooves 46 and 50 and the vertical passageway 48 form the only means of communication between the passageway 38 in the socket member 20 and a valve chamber 56 formed in the lower end of the body 10. The shoulder 18 receives a large part of the force created when the nut 32 is screwed into the body 10 to deform the compression sleeve 28 and thus prevents the socket member 20 from being urged against the resistance element 44 with sufficient force to destroy or partially close the grooves formed in the opposite faces of the resistance element.

In the valve chamber 56 I may provide any suitable valve and in the embodiment disclosed this takes the form of a ball 58 pressed against a seat 60 by a spring 62 resting on the inturned flange 64 integral with the lower end of the body 10.

In Fig. 3 I have shown a modification of my invention wherein two resistance elements 70 and 72 are arranged in series and are separated by a washer 74 having a connecting passageway 76. In this embodiment the socket member 78 does not carry a strainer and a separate ring-like element 80 carries a wire screen or other suitable strainer 82 in the upper end thereof. The ring-like element 80 is pressed into a bore 84 in the body 86 and serves to retain the resistance elements 70 and 72 and the intermediate washer 74 in place.

In Fig. 3 the resistance elements are shown as provided with spiral grooves of V-shaped cross section whereas the spiral grooves in the resistance element 44 of Fig. 1 are of square cross section. It is to be understood that the grooves in the resistance element may be of any desired cross section and that this cross section may be of various sizes to provide resistance units of different ratings and capable of passing different quantities of lubricant under the same conditions of pressure and time. It is further to be understood that any number of resistance elements may be placed in series in order to create the desired amount of resistance.

Having thus described two embodiments of my invention, what I claim and desire to secure by United States Letters Patent is:

1. A resistance unit of the class described including a disc-like element having a groove in one flat surface thereof and a part in a plane parallel with said surface cooperating therewith to define a lubricant passageway of relatively high resistance to the flow of lubricant therethrough.

2. In lubricating apparatus of the class described, a disc having a spiral groove cut in one flat surface thereof and a part parallel with said flat surface cooperating with said disc to define a lubricant passageway affording a relatively high resistance to flow of lubricant therethrough.

3. In a device of the class described, a body and a plurality of resistance elements located in said body and spaced axially thereof, and means interposed between and having cooperative engagement with said elements to afford lubricant passageways of high resistance, said passageways arranged in series in said body.

4. In apparatus of the class described, a part having a substantially flat surface and provided with a spiral groove cut in said surface and adapted to form a lubricant passageway of relatively high resistance.

5. In lubricating apparatus of the class described, a disc having substantially flat sides and a groove formed in each side and adapted to provide a lubricant passageway of relatively high resistance.

6. In a resistance unit for a centralized lubricating system, a flat strainer for removing impurities from the lubricant and a member having a spiral passageway communicating with said strainer, said spiral passageway lying in a plane parallel to said strainer.

7. In resistance units of the class described, a plurality of discs, each having a spiral groove cut in one face thereof and a spacing member located between said discs and cooperating with said grooves to provide lubricant passageways of relatively high resistance.

8. In lubricating apparatus of the class described, a disc having a groove cut in one flat face thereof, and a strainer carrying element cooperating with said disc to provide a lubricant passageway of relatively high resistance to the flow of lubricant therethrough.

9. In lubricating apparatus of the class described, a resistance unit comprising a body having a shoulder therein and a disc resting on said shoulder, said disc having a spiral groove formed in the face thereof which contacts with said shoulder and forming a lubricant passageway of high resistance, and passageways connecting said first-named passageway with a source of lubricant supply and with a bearing to be lubricated.

10. In lubricating apparatus of the class described, a resistance unit including a disc having a central depression in each face thereof and a spiral groove connecting each depression with the periphery of said disc.

11. In lubricating apparatus of the class described, a resistance unit including a disc having a central depression in each face thereof and a spiral groove connecting each central depression with the periphery of said disc, and means cooperating with said disc to cause said grooves to form a continuous passageway of relatively high resistance to the flow of lubricant therethrough.

In witness whereof, I hereunto subscribe my name this 21 day of January, 1929.

OSCAR U. ZERK.